United States Patent Office 3,356,677
Patented Dec. 5, 1967

3,356,677
1α,2α- AND 6α,7α-DIHALOMETHYLENE ANDROSTENES
Colin C. Beard, Boulder, Colo., and Alexander D. Cross, Mexico City, Mexico, assignors to Syntex Corporation, Panama, Panama, a corporation of Panama
No Drawing. Filed Apr. 5, 1966, Ser. No. 540,180
15 Claims. (Cl. 260—239.55)

This is a continuation-in-part of United States application Ser. No. 486,226, filed Sept. 9, 1965.

The present invention relates to novel aldosterone antagonists which are valuable therapeutic agents for the control of hyperaldosteronism.

More particularly, the present invention relates to novel compounds of the following formulas:

wherein R represents methylene (—$CH_2$—) or keto (>C=O), each of $R^1$ and $R^2$ represents hydrogen or methyl, $R^3$ represents hydrogen or a carboxylic acylthio group containing less than 12 carbon atoms such as acetylthio, propionylthio, octanoylthio, butanylthio, and the like, X represents chloro or fluoro, Y represents chloro, fluoro or hydrogen, and Z represents a single bond or a double bond between carbon-6 and carbon-7, provided that when $R^3$ is a carboxylic acylthio group containing less than 12 carbon atoms, Z is a single bond.

The novel compounds of the present invention are prepared according to the following outlined process.

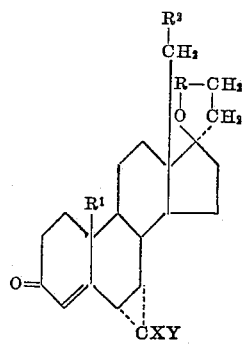
(A)

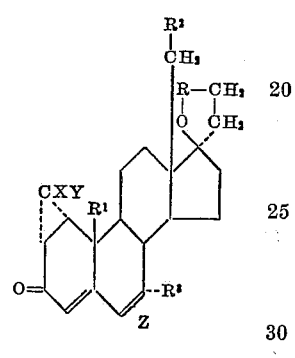
(B)

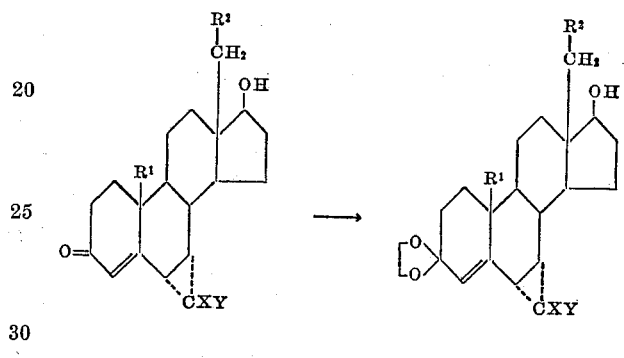
(I)            (II)

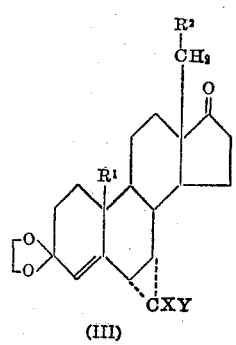
(III)

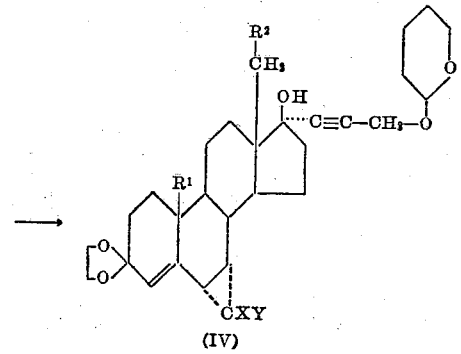
(IV)

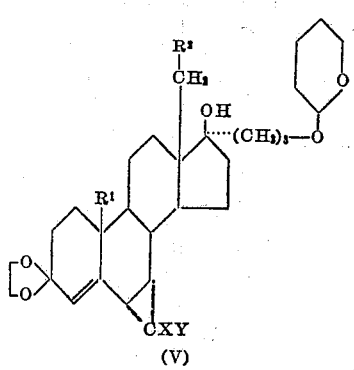
(V)

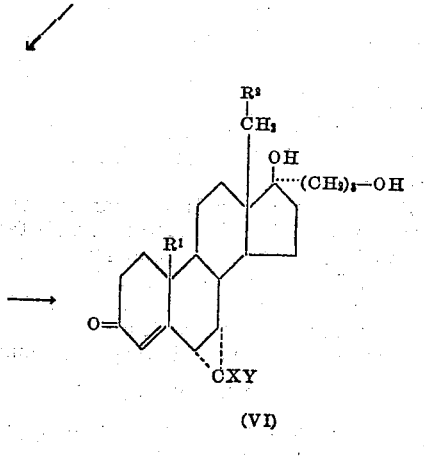
(VI)

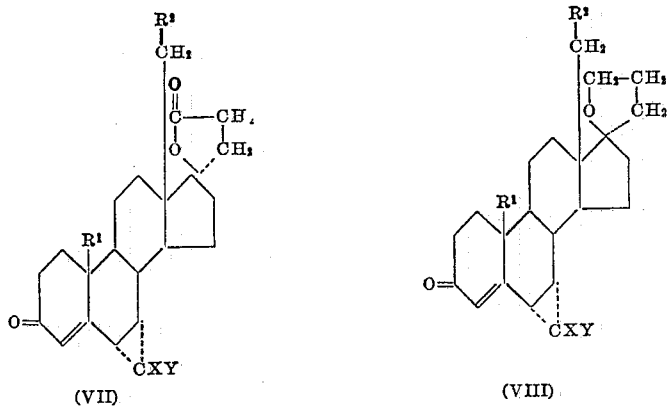

(VII)   (VIII)

In the above formulas, $R^1$, $R^2$, X and Y are as defined hereinabove.

In the above illustrated method, for the sake of simplicity only, preparation of the compounds of Formula A is shown. The same method may be used for the preparation of the compounds of the present invention according to Formula B using a $1\alpha,2\alpha$ - halomethylene-$\Delta^4$-3-one or $1\alpha,2\alpha$-dihalomethylene-$\Delta^4$-3-one starting compound in lieu of the $6\alpha,7\alpha$-substituted starting compound (I) illustrated above.

In practicing the above outlined process, the 3-keto-$6\alpha,7\alpha$-halomethylene steroid (I) is treated to introduce a 3-ketal protecting group such as the 3-cycloethylenedioxy group by conventional procedures. Thus, the steroid I may be reacted with, e.g. 2-methyl-2-ethyl-1,3-dioxolane in the presence of an acid catalyst such as p-toluenesulfonic acid to obtain the corresponding 3-cycloethylenedioxy compound (II).

The steroid II is then oxidized to the corresponding 17-keto steroid (III) by treatment with, e.g., chromium trioxide in pyridine.

The 17-keto steroid III is then treated with 3-(tetrahydropyran - 2 - yloxy)-prop-1-yne in the presence of magnesium and an alkyl halide, e.g. ethyl bromide to obtain the corresponding $17\beta$ - hydroxy - $17\alpha$-[3-(tetrahydropyran - 2 - yloxy)-prop-1-ynyl] compound (IV) which is hydrogenated by treatment with, e.g. pre-hydrogenated palladium-on-charcoal to furnish the corresponding $17\beta$ - hydroxy - $17\alpha$ - [3-(tetrahydropyran - 2 - yloxy) propanyl] steroid (V). Acid hydrolysis of the steroid V as by treatment with e.g. hydrochloric acid or p-toluenesulfonic acid in acetone or a mixture of acetic and hydrochloric acid or the like, affords the corresponding 3-keto-$17\beta$-hydroxy-$17\alpha$-hydroxypropylene steroid (VI).

The steroid (VI) when oxidized as by treatment with, e.g. chromium trioxide in pyridine, followed by ring closure as by treatment with acid affords the corresponding propionic acid lactone steroid VII.

Alternatively, the steroid (VI) may be subjected to ring closure as by treatment with acid to furnish the corresponding steroid VIII.

The starting materials (I) for the above-described process are obtained in accordance with the method described in U.S. application Ser. No. 486,226, filed Sept. 9, 1965. Thus, a $17\beta$-hydroxy-$\Delta^{4,6}$-dien-3-one steroid or the corresponding $17\beta$-acyloxy, e.g. acetoxy, steroid is treated with a molar excess of an alkali metal or alkaline earth metal salt of an acid having the formula $$W\text{—}CXY\text{—}COOH$$

in which W is chloro, iodo or bromo, X is chloro or fluoro and Y is hydrogen, chloro or fluoro to furnish the corresponding $6\alpha,7\alpha$-halomethylene steroid. After conversion to the $6\alpha,7\alpha$-halomethylene derivative, the $17\beta$-acyloxy group, if present, may be subjected to conventional saponification as by treatment with dilute methanolic potassium hydroxide to obtain the corresponding $17\beta$-hydroxy steroid. Suitable acids for preparation of the halomethylene substituted steroids include bromochloroacetic acid, dichloroacetic acid, trichloroacetic acid, chlorofluoroacetic acid, dichlorofluoroacetic acid and the like. Preferably, the salt employed is an alkali metal salt such as those of potassium, lithium, or particularly, sodium. The use of a dihaloacetate results in the formation of a fused monohalocyclopropyl grouping whereas the dihalocyclopropyl group is formed via the use of trihaloacetate.

The reaction is performed at temperatures above that at which the salt decomposes, as evidenced by the evolution of carbon dioxide, the specific temperature depending upon the particular polyhaloacetate and steroid employed. Thus, in the case of sodium trichloroacetate, a reaction temperature from 80° C. to 150° C. is generally used whereas with sodium chlorodifluoroacetate, a temperature of from 150° C. to 180° C. is employed. The reaction is preferably effected in the presence of an inert, nonaqueous organic solvent which is sufficiently polar to dissolve the polyhaloacetate. When the reaction is conducted at atmospheric pressure, the solvent is selected so that its boiling point is at or above the reaction temperature of the polyhaloacetate, with the reaction being carried out at or below the reflux temperature. Alternatively, the reaction can be conducted under suitable pressure to permit the use of lower boiling solvents. Particularly useful solvents are dimethyl diethylene glycol ether, dimethyl triethylene glycol ether, and the like. Other solvents include dimethylformamide, dioxane, dimethylsulfoxide, and the like. The reaction time will vary depending upon the selection of solvent and reagents. Isolation of the product is accomplished via conventional procedures such as chromatography.

The starting materials for the preparation of the compounds of the present invention of Formula B are obtained by treating a $17\beta$-hydroxy-$\Delta^1$-3-one steroid or the corresponding $17\beta$-acyloxy derivative, with a salt of a polyhaloacetate, in the manner described hereinabove for the preparation of the starting materials for the compounds of Formula A to furnish the corresponding $1\alpha,2\alpha$-halomethylene compound which is then converted to the corresponding $\Delta^4$-steroid by conventional means, e.g. bromination followed by dehydrobromination as with lithium carbonate or calcium oxide.

By subjecting the $1\alpha,2\alpha$-halomethylene starting material, i.e. a $17\beta$-hydroxy-$1\alpha,2\alpha$-halomethylene-$\Delta^4$-3-one steroid, to the process outlined above for the preparation of the compounds of Formula A, the compounds of the present invention of Formula B are obtained wherein Z represents a single bond between carbon-6 and carbon-7.

The corresponding compounds of Formula B wherein Z represents a double bond, i.e. the $\Delta^{4,6}$-dienes are prepared by converting a 3-keto-$\Delta^4$ steroid of Formula B into the enol ether by treatment with, e.g. ethyl orthoformate in mixture with ethanol and dioxane in the presence of p-toluenesulfonic acid followed by treatment with, e.g. 2,3-dichloro-5,6-dicyano-1,4-benzoquinone. Alternatively, the $\Delta^{4,6}$-dien-3-one steroids of Formula B may be prepared by treatment of the corresponding $\Delta^4$-3-one steroid with chloranil in the presence of an acid such as p-toluenesulfonic acid.

The thus-prepared $\Delta^{4,6}$-diene steroids may be converted into the novel compounds of Formula B wherein $R^3$ is a thioacyl group containing less than 12 carbon atoms and Z is a single bond. This conversion is accomplished by treatment of the $\Delta^{4,6}$-diene with a thiolcarboxylic acid such as thiolacetic acid, thiolpropionic acid, and the like.

The following examples are illustrative of the present invention but should not be construed as a limitation thereof.

Preparation A

A mixture of 28 g. of 3β,20β-dihydroxypregn-5-en-18-oic acid 18,20-lactone-3-acetate and 700 ml. of toluene is heated under reflux with 3N-methylmagnesium chloride in 400 ml. of tetrahydrofuran for 4 days. The reaction mixture is cooled, poured onto ice, diluted with water and extracted with ethyl acetate. The organic layer is washed with water, dried and evaporated to yield 3β,20β-dihydroxy-18-methylpregn-5-en-18-one which may be crystallized from acetone:hexane.

A solution of 12.2 g. of 3β,20β-dihydroxy-18-methyl-pregn-5-en-18-one in 400 ml. of triethylene glycol is heated under reflux at 145° C. with 80 ml. of 80% hydrazine hydrate and 25 g. of hydrazine dihydrochloride for 5 hours. The mixture is then allowed to cool and thereafter poured into water. The mixture is then extracted with ethyl acetate and the organic layer washed with water, dried and evaporated to dryness to yield the corresponding 18-hydrazone derivative which may be crystallized from ethyl acetate:hexane.

A solution of 20 ml. of hydrazine hydrate in 200 ml. of diethylene glycol is distilled, under nitrogen, until the internal temperature reaches 225° C. Ten grams of potassium hydroxide is then added cautiously and distillation contained under nitrogen, until the temperature again reaches 225° C. A solution of 15 g. of the above-prepared 18-hydrazone in 150 ml. of diethylene glycol is then added slowly while maintaining the temperature of the reaction mixture at reflux at 225° C. The resulting solution is heated under reflux in a nitrogen atmosphere of 5 hr., cooled, diluted with water and the precipitate which forms collected by filtration, washed with water and dried under vacuum to yield 18-methylpregn-5-ene-3β,20β-diol which may be crystallized from methanol.

A solution of 2.2 g. of 18-methylgren-5-ene-3β,20β-diol in 50 ml. of toluene and 8 ml. of cyclohexanone is boiled until 10 ml. of distillate is collected. Three milliliters of cyclohexanone and 2 g. of aluminum isopropoxide are then added and the mixture heated at reflux for 15 min., cooled, and poured into 150 ml. of water containing 5 ml. of acetic acid. The mixture is steam-distilled to remove solvents and the resulting emulsion extracted 3 times with 150 ml. portions of ether. The organic layer is washed with water, 2N-hydrochloric acid and saturated sodium bicarbonate solution, dried and evaporated. The residue is dissolved in hexane-benzene (2:1) and adsorbed on alumina. Elution with benzene yields 18-methylprogesterone.

A mixture of 1 g. of 18-methylprogesterone, 10 ml. of dioxane, 1 ml. of ethyl orthoformate, and 50 mg. of p-toluenesulfonic acid in the presence of Drierite, at 25° C., is stirred for 2.5 hours. The mixture is poured into aqueous potassium bicarbonate and extracted with ether. The ether extract is dried over sodium sulfate and evaporated in the presence of a trace of pyridine. The resulting residue is dissolved in hexane:benzene (4:1) and filtered through alumina furnishing 3-ethoxy-18-methyl-pregna-3,5-dien-20-one which may be crystallized from methanol containing a trace of pyridine.

A solution of 500 mg. of the thus-prepared enol-ether in 5 ml. of tetrahydrofuran is added to 15 ml. of 1 N-potassium t-butoxide in t-butanol and the resulting solution shaken at 0° C. under an atmosphere of oxygen. The uptake of oxygen ceases at 35 ml. after 15 minutes. The solution is then neutralized to pH 7 by 1 N-acetic acid, extracted with ethyl acetate and the organic layer washed with water, dried and evaporated to dryness at 30° C. The residue is crystallized from acetone:water to yield 17α-hydroperoxy-3-ethoxy - 18 - methylpregna-3,5-dien-20-one.

A mixture of 3.1 g. of the thus-obtained 17α-hydroperoxide in 100 ml. of acetic acid is stirred with 6 g. of zinc dust at 25° C. for 12 hours. The mixture is then filtered and the residue washed with ether. The filtrate is diluted with ether and the organic layer washed with water and sodium bicarbonate solution, dried and evaporated to dryness. Purification of the residue by means of preparative thin layer chromatography on H.F. silica gel with chloroform:methanol (9:1) affords 17α-hydroxy-18-methylprogesterone which may be crystallized from acetone:hexane.

A solution of 4.0 g. of 17α-hydroxy-18-methylprogesterone in 200 ml. of dry tetrahydrofuran is stirred with 20 g. of lithium tri-t-butoxyaluminum hydride at 0° C. for 7 hours and then at 25° C. for 15 hours. Water is added and the mixture concentrated to a small volume under vacuum. The residue is extracted with ethyl acetate and the organic layer washed with water and saturated sodium bicarbonate solution, dried and evaporated to dryness. This product in 200 ml. of acetic acid is reacted with 12 g. of lead tetra-acetate at 25° C. with stirring for 1.3 hours. About 20 ml. of ethylene glycol is then added to destroy the excess of oxidant and the resulting solution diluted with water and extracted with ethyl acetate. The organic layer is then washed with water and saturated sodium bicarbonate solution, dried and evaporated to dryness. The resulting residue is dissolved in hexane:benzene (1:1) adsorbed on alumina and eluted with benzene:ether (19:1) to yield 3β-hydroxy-18-methylandrost-4-en-17-one which may be crystallized from acetone:hexane.

A mixture of 250 mg. of the thus-prepared 17-keto steroid, 650 mg. of lithium tri-t-butoxyaluminum hydride and 13 ml. of tetrahydrofuran is stirred at 25° C. for 2 hours. Isolation by extraction with ether affords 18-methylandrost-4-ene-3β,17β-diol which may be crystallized from acetone:hexane.

A mixture of 170 mg. of the above 3β,17β-diol, 200 mg. of 2,3-dichloro-5,6-dicyano-1,4-benzoquinone and 5 ml. of anhydrous dioxane is allowed to stand at 25° C. for 2.5 hours and then at 0° C. for 15 hours. The reaction mixture is then diluted with 40 ml. of dichloromethane and adsorbed on 50 g. of alumina. Elution with ether affords a substantially yellow solid which is purified by preparative thin layer chromatography, on HF silica gel, in chloroform:methanol (30:1) to yield 17β-hydroxy-18-methylandrost-4-en-3-one which may be crystallized from acetone:hexane.

A mixture of 1 g. of 17β-hydroxy-18-methylandrost-4-en-3-one, 4 ml. of pyridine and 2 ml. of acetic anhydride is maintained at room temperature for 15 hours. The mixture is then poured into water and the solid which forms is collected by filtration and dried to yield 17β-acetoxy-18-methylandrost-4-en-3-one which is further purified by recrystallization from acetone:hexane.

Preparation B

To a solution of 1 g. of 18-methyl-$\Delta^4$-estren-17β-ol-3-one in 15 ml. of benzene are added 2 ml. of dihydropyran. About 1 ml. of solvent is removed by distillation and 0.4 g. of p-toluenesulfonic acid is then added to the cooled distillation residue. This mixture is allowed to stand at room temperature for about four days and then washed in turn with aqueous sodium carbonate solution and water, dried over sodium sulfate and evaporated to dryness. The residue is chromatographed on 15 g. of neutral alumina and the material obtained upon elution with hexane is recrystallized from pentane to yield 17$\beta$-tetrahydropyranyloxy-18-methyl-$\Delta^4$-estren-3-one.

To a solution of 1 g. of 17$\beta$-tetrahydropyranyloxy-18-methyl-$\Delta^4$-estren-3-one in 75 ml. of tetrahydrofuran and 125 ml. of liquid ammonia, is added over a 20-minute period 0.27 g. of lithium. The mixture is refluxed with stirring for 2½ hours and its color then discharged by the careful addition of ethanol. The resulting solution is allowed to stand at room temperature until the ammonia has evaporated and the residue is next shaken with 100 ml. of 1:1 water:methylene chloride. The aqueous layer is separated and extracted with methylene chloride and the combined extracts and organic layer are dried over magnesium sulfate and evaporated. This residue is dissolved in 100 ml. of 5:9 methylene chloride:acetone and titrated with 8 N chromic acid, maintaining a temperature of 25° C. Thirteen milliliters of water are then added with gentle shaking and the aqueous phase is separated and extracted with methylene chloride. The combined extracts and organic layer are dried over magnesium sulfate and evaporated to dryness to yield 17$\beta$-tetrahydropyranyloxy-18-methyl-5$\alpha$-estran-3-one, which may be further purified through recrystallization from ether:hexane.

To a solution of 1 g. of this compound in 30 ml. of acetic acid is added 0.5 ml. of 2 N hydrochloric acid. The mixture is allowed to stand at room temperature for 5 hours, quenched with ice water and extracted with methylene chloride. These extracts are washed to neutrality, dried over anhydrous sodium sulfate and evaporated to dryness to yield 18-methyl-5$\alpha$-estran-17$\beta$-ol-3-one which is recrystallized from acetone:hexane.

A mixture of 1 g. of 18-methyl-5$\alpha$-estran-17$\beta$-ol-3-one, 4 ml. of pyridine and 2 ml. of acetic anhydride is maintained at room temperature for 15 hours. The mixture is then poured into water and the solid which forms is collected by filtration and dried to yield 17$\beta$-acetoxy-18-methyl-5$\alpha$-estran-3-one which is further purified by recrystallization from acetone:hexane.

A solution of 1 g. of 17$\beta$-acetoxy-18-methyl-5$\alpha$-estran-3-one in 20 ml. of acetic acid is treated with a few drops of hydrogen bromide in acetic acid. A solution of 1.1 molar equivalents of bromine in 10 ml. of acetic acid is then added in a dropwise fashion with stirring. Upon consumption of the bromine, water is added and the solid which forms is collected by filtration, washed with water to neutrality and dried under vacuum to yield 2$\alpha$-bromo-17$\beta$-acetoxy-18-methyl-5$\alpha$-estran-3-one which may be further purified by recrystallization from acetone:hexane.

Two grams of 2$\alpha$-bromo-17$\beta$-acetoxy-18-methyl-5$\alpha$-estran-3-one in 40 ml. of cold dimethylformamide are added over a 15 minute period to a refluxing suspension of 5 g. of finely divided calcium carbonate in 15 ml. of refluxing dimethylformamide. The mixture is refluxed for 30 additional minutes, cooled, and filtered. After diluting with water, the filtrate is extracted with ethyl acetate and these extracts are washed with dilute hydrochloric acid, water, anhydrous sodium bicarbonate solution, and again with water. After drying over sodium sulfate, the extracts are evaporated to dryness and chromatographed on silica gel to yield 17$\beta$-acetoxy-18-methyl-$\Delta^1$-5$\alpha$-estren-3-one.

By repeating the above procedure using 17$\beta$-hydroxy-18-methylandrost-4-en-3-one in place of 17$\beta$-hydroxy-18-methylestr-4-en-3-one, there is obtained 17$\beta$-acetoxy-18-methyl-5$\alpha$-androst-1-en-3-one.

*Preparation C*

To a suspension of 1 g. of 17$\beta$-acetoxy-$\Delta^4$-androsten-3-one in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 3-ethoxy-17$\beta$-acetoxy-$\Delta^{3,5}$-androstadiene which is recrystallized from acetone:hexane.

To a solution of 1 g. of 3-ethoxy-17$\beta$-acetoxy-$\Delta^{3,5}$-androstadiene in 20 ml. of tetrahydrofuran, cooled to 0° C., is added 1.05 molar equivalents of 2,3-dichloro-5,6-dicyano-1,4-benzoquinone and 100 mg. of p-toluenesulfonic acid. The resulting mixture is stirred at 0° C. for 30 minutes, filtered, and diluted with 100 ml. of methylene chloride. The organic phase is separated, washed with 5% aqueous sodium hydroxide solution until the washings were colorless and then with water to neutrality, dried over sodium sulfate and evaporated to dryness to yield 17$\beta$-acetoxy-$\Delta^{4,6}$-androstadien-3-one, which may be further purified through recrystallization from acetone:hexane.

Similarly, by subjecting 17$\beta$-acetoxy-18-methylestr-4-en-3-one, 17$\beta$-acetoxyestr-4-en-3-one, and 17$\beta$-acetoxy-18-methylandrost-4-en-3-one to the foregoing procedure, the corresponding $\Delta^{4,6}$-diene derivatives are obtained.

EXAMPLE 1

To a gently refluxing and stirred solution of 1 g. of 17$\beta$-acetoxy-18-methyl-5$\alpha$-estr-1-en-3-one in 8 ml. of dimethyl diethylene glycol ether is added over a two hour period in a dropwise fashion, a solution of 30 equivalents of sodium chlorodifluoroacetate in 30 ml. of dimethyl diethylene glycol ether. The mixture is refluxed until the reaction is substantially complete, as determined by observation of the U.V. spectra, and then filtered. The filtrate is evaporated to dryness in vacuo and the residue chromatographed on alumina, eluting with methylene chloride, to yield 1$\alpha$,2$\alpha$-difluoromethylene-17$\beta$-acetoxy-18-methyl-5$\alpha$-estran-3-one.

Similarly, by repeating the foregoing procedure using 17$\beta$-acetoxy-5$\alpha$-estr-1-en-3-one, 17$\beta$-acetoxy-5$\alpha$-androst-1-en-3-one, or 17$\beta$-acetoxy-18-methyl-5$\alpha$-androst-1-en-3-one as the starting material, there are obtained the corresponding 1$\alpha$,2$\alpha$-difluoromethylene derivatives.

EXAMPLE 2

To a solution of 0.75 ml. of bromine in 15 ml. of dioxane containing a few drops of anhydrous hydrogen bromide is added 0.5 g. of 1$\alpha$,2$\alpha$-difluoromethylene-17$\beta$-acetoxy-5$\alpha$-androstan-3-one. The mixture is stirred until the color disappears and then poured into ice water. The solid which forms is collected by filtration, washed well with water and dried. A solution of 0.4 g. of this product in 5 ml. of dimethylformamide is mixed with 0.25 g. of lithium bromide and 0.2 g. of lithium carbonate. This mixture is heated under nitrogen at 100° C. for 16 hours, filtered and evaporated to yield 1$\alpha$,2$\alpha$-difluoromethylene-17$\beta$-acetoxyandrost-4-en-3-one which may be further purified through recrystallization from acetone:hexane.

A mixture of 1 g. of 1$\alpha$,2$\alpha$-difluoromethylene-17$\beta$-acetoxy-androst-4-en-3-one in 50 ml. of methanol and 0.5 g. of potassium hydroxide in 1 ml. of water is refluxed for 3 hours and then poured into ice water. The solid which forms is collected by filtration, washed with water and dried to yield 1$\alpha$,2$\alpha$-difluoromethylene-17$\beta$-hydroxyandrost-4-en-3-one which is recrystallized from acetone:hexane.

By repeating the process of this example, 1$\alpha$,2$\alpha$-difluoromethylene-17$\beta$-acetoxy-5$\alpha$-estran-3-one, 1$\alpha$,2$\alpha$-difluoromethylene-17$\beta$-acetoxy-18-methyl-5$\alpha$-androstan-3-one and 1$\alpha$,2$\alpha$-difluoromethylene-17$\beta$-acetoxy-18-methyl-5$\alpha$-estran-3-one are converted into the corresponding 1$\alpha$,2$\alpha$-difluoromethylene-17$\beta$-hydroxy-$\Delta^4$-3-one derivatives.

EXAMPLE 3

To a refluxing solution of 1 g. of 17β-acetoxyandrosta-4,6-dien-3-one in 10 ml. of dimethyl diethylene glycol ether is added over a two hour period in a dropwise fashion with stirring, a solution of 35 equivalents of sodium chlorodifluoroacetate in 40 ml. of dimethyl diethylene glycol ether. The mixture is refluxed until the U.V. spectra indicates the disappearance of the 3-keto-$\Delta^{4,6}$-diene system and is then filtered. The filtrate is evaporated to dryness and the residue is chromatographed on alumina, eluting with methylene chloride, to yield 6α,7α-difluoromethylene-17β-acetoxyandrost-4-en-3-one.

A solution of 1 g. of 6α,7α-difluoromethylene-17β-acetoxyandrost-4-en-3-one in 50 ml. of methanol is heated at reflux for 3 hours with a solution of potassium hydroxide in 1 ml. of water. The reaction mixture is then poured into ice water and the solid which forms is collected by filtration, washed with water to neutrality and dried to yield 6α,7α-difluoromethylene-17β-hydroxyandrost-4-en-3-one which is recrystallized from methylene chloride: ether.

By repeating the procedure of this example, 17β-acetoxyestra - 4,6-dien-3-one, 17β-acetoxy-18-methylestr-4,5-dien-3-one and 17β-acetoxy-18-methylandrosta-4,6-dien-3-one are converted into the corresponding 6α,7α-difluoromethylene-17β-hydroxy-$\Delta^4$-3-one derivative.

EXAMPLE 4

A mixture of 2 g. of 6α,7α-difluoromethylene-17β-hydroxyandrost-4-en-3-one in 30 ml. of 2-methyl-2-ethyl-1,3-dioxolane and 70 mg. of p-toluenesulfonic acid is heated at reflux with distillation for one hour. The mixture is then cooled, diluted with water and extracted with ethyl acetate. The extracts are washed to neutrality, dried and evaporated to dryness to yield 3-ethylenedioxy-6α,7α-difluoromethylene-17β-hydroxyandrost-4-ene which is recrystallized from acetone:hexane.

A solution of 6 g. of the above 3-ethylenedioxy compound in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 3-ethylenedioxy-6α,7α-difluoromethyleneandrost-4-en-17-one which may be further purified by recrystallization from acetone:hexane.

To a stirred solution of 1.1 g. of magnesium and 5 g. of ethyl bromide in 100 ml. of ether is added, over a 30 minute period, a solution of 6 g. of 3-(tetrahydropyran-2-yloxy)-prop-1-yne in 60 ml. of ether. Stirring is continued for an additional 60 minutes. A solution of 1 g. of 3-ethylenedioxy-6α,7α-difluoromethyleneandrost-4-en-17-one in 10 ml. of benzene is then added to the solution and the resulting mixture is heated at reflux for one hour. After cooling, 250 ml. of 2% aqueous ammonium chloride is added, the mixture is separated and the organic solution is dried over sodium sulfate and evaporated. The residue is then chromatographed to yield 3-ethylenedioxy-6α,7α-difluoromethylene - 17α - [3 - (tetrahydropyran-2-yloxy)-prop-1-ynyl]-androst-4-en-17β-ol which is recrystallized from acetone:hexane.

A solution of 3 g. of the above-prepared tetrahydropyranyl ether steroid in 125 ml. of dioxane is hydrogenated at 25° C./570 mm. with 0.5 g. of pre-hydrogenated 10% palladium-on-charcoal. Upon the consumption of the theoretical amount of hydrogen, the solution is filtered and the filtrate evaporated to dryness under reduced pressure to yield the corresponding 3-ethylenedioxy-6α,7α-difluoromethylene - 17α - [3-(tetrahydropyran-2-yloxy)-propyl]-androst-4-en-17β-ol.

A mixture of 0.5 g. of the above-prepared steroid in 30 ml. of acetone and 50 mg. of p-toluenesulfonic acid is allowed to stand at room temperature for 15 hours. It is then poured into ice water and extracted with ethyl acetate. These extracts are washed with water to neutrality, dried over sodium sulfate and evaporated to dryness. The residue is triturated with ether to yield 6α,7α-difluoromethylene - 17β-hydroxy-17α-(3-hydroxypropyl)-androst-4-en-3-one which is recrystallized from acetone:hexane.

EXAMPLE 5

A solution of 6 g. of 6α,7α-difluoromethylene-17β-hydroxy-17α-(3-hydroxypropyl)-androst-4-en-3-one in 120 ml. of pyridine is added to a mixture of 6 g. of chromic trioxide in 20 ml. of pyridine. The reaction mixture is allowed to stand at room temperature for 15 hours whereupon the mixture is acidified by the addition of hydrochloric acid. The reaction mixture is then diluted with methylene chloride and filtered through Celite diatomaceous earth. The filtrate is washed well with water, dried and evaporated to dryness to yield 3'-(6α,7α-difluoromethylene - 17β - hydroxyandrost-4-en-3-one-17α-yl)-propionic acid lactone.

EXAMPLE 6

A solution of 6 g. of 6α,7α-difluoromethylene-17β-hydroxy-17α-(3-hydroxypropyl)-androst-4-en-3-one and 1 equivalent of p-toluenesulfonyl chloride in 140 ml. of pyridine is allowed to stand overnight at room temperature. The reaction mixture is then diluted with methylene chloride and filtered. The filtrate is washed with water, dried and evaporated to dryness affording 3'-(6α,7α-difluoromethylene - 17β-hydroxyandrost-4-en-3-one-17α-yl)-propane 1',17β-oxide.

EXAMPLE 7

By repeating the procedure of Example 4 with the exception of replacing 6α,7α-difluoromethylene-17β-hydroxyandrost-4-en-3-one with 6α,7α-difluoromethylene-17β - hydroxyestr - 4-en-3-one, 6α,7α-difluoromethylene-17β-hydroxy-18-methylestr-4-en-3-one or 6α,7α-difluoromethylene - 17β - hydroxy-18-methylandrost-4-en-3-one, there are obtained the corresponding 17α-(3-hydroxypropyl) derivatives.

EXAMPLE 8

The procedure of Example 5 is repeated with the exception of substituting the 17α-(3-hydroxypropyl) compounds of Example 7 for 6α,7α-difluoromethylene-17β-hydroxy-17α-(3-hydroxypropyl)-androst-4-en-3-one as the starting material to yield the corresponding propionic acid lactone compounds, e.g. 3' - (6α,7α - difluoromethylene-17β-hydroxyestr-4-en-3-one-17α-yl)-propionic acid lactone, etc.

EXAMPLE 9

By repeating the process of Example 6 except for replacing 6α,7α-difluoromethylene-17β-hydroxy-17α-(3-hydroxypropyl)-androst-4-en-3-one with the 17α-(3-hydroxypropyl) compounds of Example 7, there are obtained the corresponding propane 1',17β-oxide compounds, e.g. 3'-(6α,7α - difluoromethylene - 17β-hydroxyestr-4-en-3-one-17α-yl)-propane 1',17β-oxide, etc.

EXAMPLE 10

A mixture of 2 g. of 1α,2α-difluoromethylene-17β-hydroxy-androst-4-en-3-one in 30 ml. of 2-methyl-2-ethyl-1, 3-dioxolane and 70 mg. of p-toluenesulfonic acid is heated at reflux with distillation for one hour. The mixture is then cooled, diluted with water and extracted with ethyl acetate. The extracts are washed to neutrality, dried and evaporated to dryness to yield 3-ethylenedioxy-1α,2α-difluoromethylene-17β-hydroxyandrost-5-ene which is recrystallized from acetone:hexane.

A solution of 6 g. of 3-ethylenedioxy-1α,2α-difluoromethylene-17β-hydroxyandrost-5-ene in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 3-ethylenedioxy-1α,2α-difluoromethylene androst-5-en-17-one which may be further purified by recrystallization from acetone:hexane.

To a stirred solution of 1.1 g. of magnesium and 5 g. of ethyl bromide in 100 ml. of ether is added, over a 30 minute period, a solution of 6 g. of 3-(tetrahydropyran-2-yloxy)-prop-1-yne in 60 ml. of ether. Stirring is continued for an additional 60 minutes. A solution of 1 g. of 3-ethylenedioxy - $1\alpha,2\alpha$-difluoromethyleneandrost-5-en-17-one in 10 ml. of benzene is then added to the solution and the resulting mixture is heated at reflux for one hour. After cooling, 250 ml. of 2% aqueous ammonium chloride is added, the mixture is separated and the organic solution is dried over sodium sulfate and evaporated. The residue is then chromatographed to yield 3-ethylenedioxy-$1\alpha,2\alpha$ - difluoromethylene - $17\alpha$[3-(tetrahydropyran-2-yloxy)-prop-1-ynyl]-androst-5-en-$17\beta$-ol which is recrystallized from acetone:hexane.

A solution of 3 g. of 3-ethylenedioxy-$1\alpha,2\alpha$-difluoromethylene-$17\alpha$-[3-(tetrahydropyran - 2 - yloxy)-prop-1-ynyl]-androst-5-en-$17\beta$-ol in 125 ml. of dioxane is hydrogenated at 25° C./570 mm. with 0.5 g. of pre-hydrogenated 10% palladium-on-charcoal. Upon the consumption of the theoretical amount of hydrogen, the solution is filtered and the filtrate evaporated to dryness under reduced pressure to yield 3-ethyenedioxy-$1\alpha,2\alpha$-difluoromethylene-$17\alpha$-[3-(tetrahydropyran - 2 - yloxy)-propyl]-androst-5-en-$17\beta$-ol.

A mixture of 0.5 g. of the above steroid in 30 ml. of acetone and 50 mg. of p-toluenesulfonic acid is allowed to stand at room temperature for 15 hours. It is then poured into ice water and extracted with ethyl acetate. These extracts are washed with water to neutrality, dried over sodium sulfate and evaporated to dryness. The residue is triturated with ether to yield $1\alpha,2\alpha$-difluoromethylene-$17\beta$-hydroxy-$17\alpha$-(3-hydroxypropyl)-androst - 4 - en-3-one which is recrystallized from acetone:hexane.

By repeating the process of this example using as the starting material, $1\alpha,2\alpha$-difluoromethylene-$17\beta$-hydroxyestr-4-en-3-one, $1\alpha,2\alpha$-difluoromethylene - $17\beta$ - hydroxy-18-methylandrost-4-en-3-one, or $1\alpha,2\alpha$-difluoromethylene-17-$\beta$-hydroxy-18-methylestr-4-en-3-one in place of $1\alpha,2\alpha$-difluoromethylene - $17\beta$ - hydroxyandrost-4-en-3-one, the corresponding $17\alpha$-(3-hydroxypropyl) derivatives are obtained.

EXAMPLE 11

The procedure of Example 5 is repeated with the exception of substituting the $17\alpha$-(3-hydroxypropyl) compounds of Example 10 for $6\alpha,7\alpha$-difluoromethylene-$17\beta$-hydroxy-$17\alpha$-(3-hydroxypropyl) - androst-4-en-3-one as the starting material to yield the corresponding propionic acid lactone compounds, e.g. 3'-($1\alpha,2\alpha$-difluoromethylene - $17\beta$ - hydroxyandrost-4-en-3-one-$17\alpha$-yl)-propionic acid lactone, etc.

EXAMPLE 12

By repeating the process of Example 6 except for replacing $6\alpha,7\alpha$-difluoromethylene - $17\beta$ - hydroxy-$17\alpha$-(3-hydroxypropyl)-androst-4-en-3-one with the $17\alpha$-(3-hydroxypropyl) compounds of Example 10 as the starting material, there are obtained the corresponding propane $1',17\beta$ - oxide compounds, e.g. 3'-($1\alpha,2\alpha$-difluoromethylene - $17\beta$ - hydroxyandrost-4-en-3-one-$17\alpha$-yl)-propane $1',17\beta$-oxide, etc.

EXAMPLE 13

A mixture of 0.5 g. of 3'-($1\alpha,2\alpha$-difluoromethylene-$17\beta$-hydroxy-androst-4-en-3-one-$17\alpha$-yl) propionic acid lactone, 10 ml. of dioxane and 0.35 g. of 2,3-dichloro-5,6-dicyano-1,4-benzoquinone is refluxed for 10 hours. The mixture is then cooled, filtered and evaporated to dryness. The residue is dissolved in acetone and filtered through 10 g. of alumina and concentrated to yield 3'-($1\alpha,2\alpha$ - difluoromethylene - $17\beta$ - hydroxyandrosta-4,6-dien-3-one-$17\alpha$-yl) propionic acid lactone which may be further purified by recrystallization from acetone:hexane.

EXAMPLE 14

A solution of 2.5 g. of 3'-[$1\alpha,2\alpha$-difluoromethylene-$17\beta$ - hydroxyandrost-4-en-3-one-$17\alpha$-yl]-propane $1',17\beta$-oxide, 2.5 g. of chloranil and 0.025 g. of p-toluenesulfonic acid in 250 ml. of xylene is heated at reflux for 20 hours. The mixture is cooled and filtered and the solvent removed by vacuum distillation. The residue is taken up in benzene and chromatographed over silica using benzene and ethyl acetate as the eluant furnishing the corresponding $\Delta^{4,6}$-diene steroid which may be purified further by recrystallization from ethyl aceate.

EXAMPLE 15

By repeating the procedure of Example 14, 3'[$1\alpha,2\alpha$-difluoromethylene - $17\beta$ - hydroxyestr-4-en-3-one-$17\alpha$-yl]-propionic acid lactone, 3'-[$1\alpha,2\alpha$-difluoromethylene-$17\beta$-hydroxy - 18 - methylestr-4-en-3-one-$17\alpha$-yl] propane $1',17\beta$-oxide are converted into the corresponding $\Delta^{4,6}$-diene steroid.

EXAMPLE 16

A solution of 0.75 g. of the $\Delta^{4,6}$-diene steroid obtained in Example 13 in 0.75 ml. of thiolacetic acid is heated on a steam bath for 1 hour. Most of the excess solvent is removed in a stream of dry nitrogen. Crystallization of the residue from methanol yields 3'-[$1\alpha,2\alpha$-difluoromethylene-$17\beta$-hydroxy-$7\alpha$-acetyl-thioandrost - 4 - en - 3-one-$17\alpha$-yl]-propionic acid lactone.

EXAMPLE 17

A solution of 0.65 g. of 3'-[$1\alpha,2\alpha$-difluoromethylene-$17\beta$ - hydroxyandrosta-4,6-dien-3-one-$17\alpha$-yl] - propane $1',17\beta$-oxide in 0.5 ml. of thiolpropionic acid is heated on a steam bath for about 0.5 hour. The excess acid is removed under vacuum and on trituration with methanol, 3'-[$1\alpha,2\alpha$-difluoromethylene-$7\alpha$-propionylthio - $17\beta$ - hydroxy-androst-4-en-3-one-$17\alpha$-yl]-propane $1'$-$17\beta$-oxide is obtained.

EXAMPLE 18

A solution of 170 mg. of 3'-[$1\alpha,2\alpha$-difluoromethylene-$17\beta$ - hydroxyestra-4,6-dien-3-one-$17\alpha$-yl]-propionic acid lactone in 0.5 ml. of thiolacetic acid is heated on a steam bath for 1.5 hours. The excess acid is removed under vacuum and on trituration with methanol, 3'-[$1\alpha,2\alpha$-difluoromethylene - $17\beta$ - hydroxy-$7\alpha$-acetylthioestr-4-en-3-one-$17\alpha$-yl]-propionic acid lactone is obtained.

EXAMPLE 19

A solution of 1 g. of 3-ethylenedioxy-$6\alpha,7\alpha$-difluoromethyleneandrost-4-en-17-one in 30 ml. of anhydrous benzene is added under nitrogen to a solution of 1.4 g. of potassium in 30 ml. of t-amyl alcohol previously saturated with acetylene. A slow current of purified acetylene is continually passed through the solution for 40 hours. The mixture is diluted with water and extracted with benzene. These extracts are washed with water to neutrality, dried over sodium sulfate and evaporated. Chromatography of the residue on alkaline alumina with 2:3 hexane: benzene yields 3-ethylenedioxy-$6\alpha,7\alpha$-difluoromethylene-$17\alpha$-ethynylandrost-4-en-$17\beta$-ol which is recrystallized from acetone:hexane.

One gram of the above $17\alpha$-ethynyl compound is dissolved in 5 ml. of tetrahydrofuran and added to a refluxing solution of 6 ml. of 3 M methylmagnesium bromide in 15 ml. of tetrahydrofuran. The tetrahydrofuran is previously purified by distillation from excess Grignard reagent. The resulting mixture is stirred and refluxed for 24 hours. A slight positive pressure of carbon dioxide is then maintained over the reaction mixture for 24 hours with stirring. The mixture is poured into excess ice-cold 0.2 M sulfuric acid and most of the solvent removed by vacuum distillation. The product is filtered, washed free of mineral acid, and dried to yield 3-ethylenedioxy-$6\alpha,7\alpha$-difluoromethylene-$17\beta$-hydroxyandrost-4-en-$17\alpha$-ylpropiolic acid.

One gram of the above 17α-ylpropiolic acid steroid is dissolved in 10 ml. of dioxane containing 1 ml. of pyridine. The solution is then stirred under hydrogen at atmospheric pressure in the presence of 0.3 g. of 5% palladium on calcium carbonate until one equivalent is adsorbed. Then the catalyst is removed and the solvent removed by vacuum distillation. The resulting residue is dissolved in 30 ml. of acetone and 50 mg. of p-toluenesulfonic acid is added. The resulting mixture is allowed to stand at room temperature for 15 hours. It is then poured into ice water and extracted with ethyl acetate. These extracts are washed with water to neutrality, dried over sodium sulfate and evaporated to dryness. The residue is triturated with ether to yield 3-(3-oxo-17β-hydroxy-6α,7α - difluoromethyleneandrost-4-en-17α-yl) propenoic acid lactone.

A mixture of 1 g. of the above unsaturated lactone in 50 ml. of ethyl alcohol is hydrogenated at atmospheric pressure and room temperature in the presence of 0.1 g. of 5% palladium supported on carbon powder. When one equivalent of hydrogen has been absorbed, the reduction is stopped; and the reaction mixture is then filtered to remove the catalyst. The filtrate is evaporated to dryness, following which the residue is crystallized from approximately 40 ml. of 70% aqueous methyl alcohol to yield 3-(3-oxo-17β-hydroxy - 6α,7α - difluoromethyleneandrost-4-en-17α-yl)-propionic acid lactone.

What is claimed is:

1. A compound of the formula

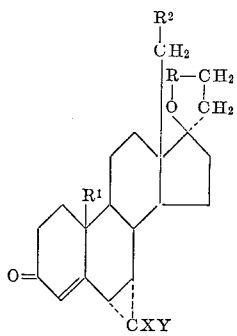

wherein X is selected from the group consisting of chloro and fluoro, Y is selected from the group consisting of hydrogen, chloro and fluoro, R is selected from the group consisting of methylene and keto, and $R^1$ and $R^2$ are indivdually selected from the group consisting of hydrogen and methyl.

2. A compound according to claim 1 wherein X and Y are each fluoro.

3. A compound according to claim 2 wherein $R^1$ is methyl and $R^2$ is hydrogen.

4. A compound according to claim 2 wherein $R^1$ is hydrogen.

5. A compound according to claim 2 wherein $R^1$ is hydrogen and $R^2$ is methyl.

6. A compound according to claim 2 wherein $R^1$ and $R^2$ are each methyl.

7. A compound of the formula

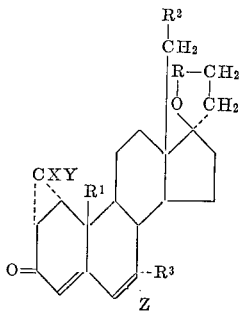

wherein X is selected from the group consisting of chloro and fluoro, Y is selected from the group consisting of hydrogen, chloro and fluoro, R is selected from the group consisting of methylene and keto, $R^1$ and $R^2$ are individually selected from the group consisting of hydrogen and methyl, $R^3$ is selected from the group consisting of hydrogen and a carboxylic acylthio group containing less than 12 carbon atoms, and Z is selected from the group consisting of a single bond and a double bond between carbon-6 and carbon-7, provided that when $R^3$ is a carboxylic acylthio group containing less than 12 carbon atoms, Z is a single bond.

8. A compound according to claim 7 wherein X and Y are each fluoro.

9. A compound according to claim 7 wherein Z is a double bond and X and Y are each fluoro.

10. A compound according to claim 7 wherein $R^1$ is methyl, $R^2$ and $R^3$ are each hydrogen, Z is a double bond, and X and Y are each fluoro.

11. A compound according to claim 7 wherein Z is a single bond and X and Y are each fluoro.

12. A compound according to claim 7 wherein Z is a single bond, X and Y are each fluoro, and $R^1$ is methyl.

13. A compound according to claim 12 wherein $R^2$ and $R^3$ are each hydrogen.

14. A compound according to claim 12 wherein $R^3$ is acetylthio.

15. A compound according to claim 11 wherein $R^3$ is acetylthio.

References Cited

UNITED STATES PATENTS 3,127,396   3/1964   Weicher et al. _____ 260—239.5
3,243,434   3/1966   Krakower _____ 260—239.55

LEWIS GOTTS, Primary Examiner.

H. FRENCH, Assistant Examiner.